UNITED STATES PATENT OFFICE.

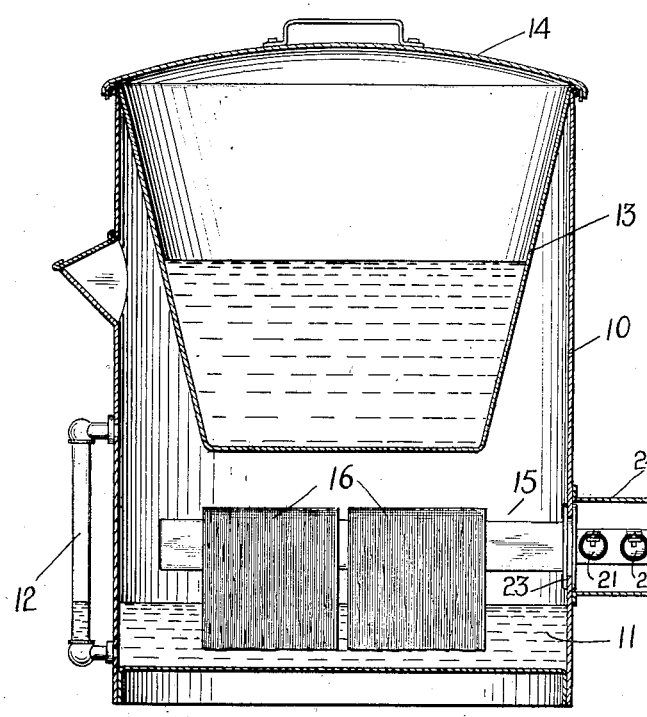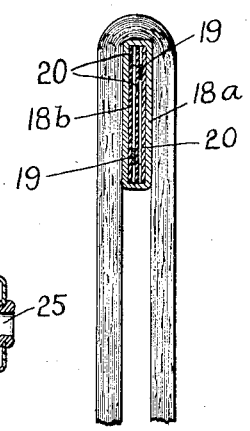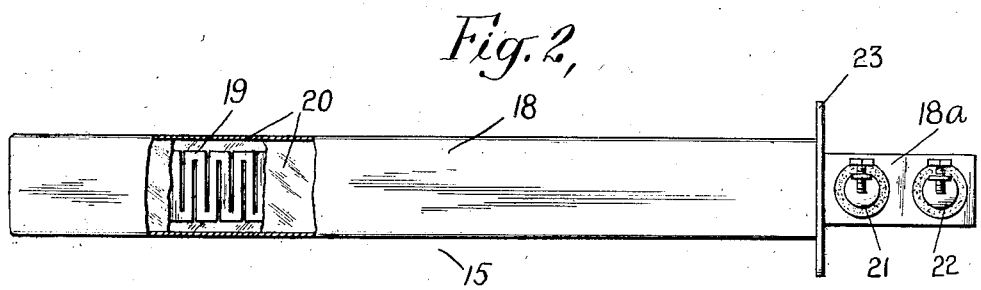

WILLIAM S. HADAWAY, JR., OF NEW ROCHELLE, NEW YORK.

VAPOR-HEATER.

1,163,657.   Specification of Letters Patent.   Patented Dec. 14, 1915.

Application filed October 23, 1913. Serial No. 796,763.

*To all whom it may concern:*

Be it known that I, WILLIAM S. HADAWAY, Jr., a citizen of the United States, and a resident of New Rochelle, in the county of Westchester and State of New York, have invented certain new and useful Improvements in Vapor-Heaters, of which the following is a specification, reference being had to the accompanying drawings, forming a part thereof.

My invention relates to the evaporation of liquids and particularly to apparatus in which steam is utilized for heating or cooking as for example in double boilers, glue pots and the like.

One object of my invention is to provide means for isolating a small quantity of a liquid and so applying heat thereto as to produce an instantaneous and efficient steam generator.

Another object is to provide a capillary agent for automatically and continuously feeding a small quantity of liquid to a heated body or surface in order to vaporize the liquid with the expenditure of a relatively small quantity of energy.

Another object is to provide an electric heater for vaporizing liquids in combination with means for rendering the quantity of heat applied independent of the total body of liquid to be vaporized or the heat capacity of its container.

Another object is to combine an electric heater element with a wick in order to vaporize a liquid into which the wick is dipped.

Other objects and advantages of my invention will be set forth hereinafter.

My invention is obviously applicable to a great variety of arts and devices and while I have illustrated it as applied to a glue pot or similar cooking device, I desire that only such limitations be imposed as are indicated in the appended claims.

Referring to the drawings, Figure 1 is a sectional elevation of glue pot arranged and constructed in accordance with my invention. Figs. 2 and 3 are respectively a side view and transverse section of an electric heater element which forms a part of the device of Fig. 1.

The device illustrated comprises a tank or boiler 10 adapted to contain a body of water 11, a gage 12 being provided to indicate the water level from the exterior. Set in the top of the tank or boiler 10 and supported at its upper edge is an inner receptacle 13 which may contain glue to be melted or food to be cooked dependent upon the service to which the apparatus is applied. A lid or cover 14 is fitted on the top. Extending laterally from one wall of the tank or boiler above the water level, is an electric heater unit 15 preferably in the form of a bar on which is supported a plurality of wicks 16 which dip into the water and preferably extend to the bottom of the tank.

The heater unit or element may be constructed in any suitable manner and may be of any desired type. I prefer to employ the structure shown in Figs. 2 and 3 which comprises a sheath 18, a resistance ribbon 19 and insulating strips 20, which space the sections of the resistance ribbon apart and separate them from the walls of the sheath. The sheath is preferably composed of two strips of sheet metal 18$^a$ and 18$^b$, which are welded together at their edges after the resistance element and the insulating strips are assembled between them. The strip 18$^a$ is somewhat longer than the strip 18$^b$ and is arranged to support terminal members 21 and 22 in a well known manner. The sheath is provided with a flange 23, which is secured to the wall of the tank or boiler 10, the terminal supporting end of the strip 18$^a$ extending through the wall of the tank into a protecting casing or cap 24 and having a hole 25 through which supply circuit conductors may be led. Instead of using only a single bar heater, several bars may be employed, each being either independent and provided with separate terminals, or all being joined at their terminal ends and having a pair of common terminals. Each bar or each branch of the heater is preferably provided with one or more wicks.

The operation of the heater is as follows: When it is desired to start the device, it is only necessary to supply electric energy to the heater element 15. Steam is instantly generated in the wicks and immediately rises against the exposed surfaces of the inner receptacle 13, which contains the material to be cooked or melted. As fast as the water is vaporized from the upper part of the wick, more water will be fed from the lower part of the tank, by capillary action, in a well known manner.

The wicks may be made of cotton or other material, which is capable of feeding the water by capillary action. In order to avoid the possibility of accident, in case the water becomes exhausted and the wick heated to a very high temperature, it may be found preferable to utilize asbestos in the manufacture of the wicks. So long as the wicks dip into water, there is of course no possibility of overheating them.

One of the great advantages of my invention arises from the fact that no matter how large a body of liquid is contained in the bottom of the tank, a small electric heater acting on the wicks is able to produce steam immediately and by this means to transfer heat very rapidly to the receptacle 13 above, or to some other object. It is nevertheless true that a small quantity of energy produces immediate results and that the temperature of the body of liquid in the tank is not changed and may remain at a substantially constant low value.

I believe that I have obtained results which have hitherto been considered impossible and that the combination of a capillary device with a heater is broadly new. Consequently I intend that only such limitations be imposed as are indicated in the appended claims.

What I claim is:

1. A vapor heater comprising a tank or boiler, an inner receptacle extending part way to the bottom of the tank, an electric heater above the liquid level of the tank and below the bottom of the inner receptacle and means for gradually transferring liquid, to be influenced by the heater.

2. A vapor heater comprising a tank or boiler, an inner receptacle extending part way to the bottom of the tank, an electric heater above the liquid level of the tank and below the bottom of the inner receptacle and means dependent upon capillary action for transferring the liquid to be vaporized by the heater.

3. A vapor heater comprising a tank or boiler, an inner receptacle extending part way to the bottom of the tank, an electric heater above the liquid level of the tank and below the bottom of the inner receptacle, and a wick associated with the heater and dipping into the liquid.

4. A vaporizer comprising a horizontal electric heater unit, a wick passing over and supported by the unit, and a receptacle below said unit for containing liquid into which the wick extends.

5. A vaporizer comprising a horizontal electric heater unit having flat sides, a wick passing over and supported by the upper edge of said unit and lying against the flat sides thereof, and a receptacle below said unit for containing liquid into which the wick extends.

In witness whereof, I have hereunto set my hand this 22 day of October, 1913.

WILLIAM S. HADAWAY, Jr.

Witnesses:
G. R. QUIMBY,
F. B. GRAVES.